United States Patent [19]

Gayfer

[11] Patent Number: 5,501,513
[45] Date of Patent: Mar. 26, 1996

[54] EMERGENCY VENT VALVE

[75] Inventor: Robert Gayfer, Watertown, N.Y.

[73] Assignee: New York Air Brake Corporation, Watertown, N.Y.

[21] Appl. No.: 340,856

[22] Filed: Nov. 15, 1994

[51] Int. Cl.$^6$ ..................................................... B60T 15/18
[52] U.S. Cl. ................................. 303/73; 303/74; 303/82
[58] Field of Search ............................ 303/72, 73, 74, 303/81, 82, 83, 35–39; 137/474, 475

[56] References Cited

U.S. PATENT DOCUMENTS

| | | | |
|---|---|---|---|
| 4,014,580 | 3/1977 | Bridigum | 303/82 |
| 4,026,609 | 5/1977 | Bridigum | 303/82 |
| 4,037,880 | 7/1977 | Bridigum | 303/82 |
| 4,974,911 | 12/1990 | Hart | 303/82 |
| 5,083,843 | 1/1992 | Engle | 303/74 |
| 5,096,266 | 3/1992 | Skantar | 303/82 |

Primary Examiner—Robert J. Oberleitner
Assistant Examiner—Peter M. Poon
Attorney, Agent, or Firm—Barnes & Thornburg

[57] ABSTRACT

An emergency vent valve including a piston responsive to the differential pressure between the brake pipe and a control volume to open a vent valve to vent the brake pipe to atmosphere and includes an exhaust valve responsive to the differential pressure between brake pipe and control volume to connect the control volume to atmosphere through a service check and when the vent valve is opened through a second blow-down choke of a lesser rate which limits the exhausting of the control chamber. A choke valve connected to the piston connects the blow-down choke in series with the service choke when the vent valve becomes fully open.

13 Claims, 3 Drawing Sheets

EMERGENCY VENT VALVE

BACKGROUND AND SUMMARY OF THE INVENTION

The present invention relates generally to vent valves for locally venting a brake pipe of a air brake system vehicle in response to an emergency brake application and more specifically to an emergency vent valve to be used in combination with an improved control valve.

With the advent of longer and longer trains, vent valves are included in the brake pipe to accelerate the application of an emergency signal through the train to the various control valves. This is an effort to decrease the transmission time of the emergency signal down the brake pipe and to have the brakes apply as simultaneously as possible. It should be noted that the vent valves have been used in combination with control valves which include a service and an emergency portion. The emergency portion not only applies an emergency brake valve to the brake cylinder, but also locally vents the brake pipe in response to an emergency brake application.

Vent valves have operated on two principles of operation. In both principles of operation, a control volume pressure is reduced to match the reduction of the brake pipe at a service rate to prevent the vent valve from operating. When the brake pipe reduction is at a emergency rate, the reduction of pressure in the control volume cannot keep up and a differential pressure is created across a piston which operates the vent valve. The control volume using one principle is vented to atmosphere and using the other principle is vented to the brake pipe.

When the control volume is vented to brake pipe, there is usually a restriction which defines the rate of flow which differentiates between the service and the emergency brake application. This restriction generally interconnects the two sides of the piston which operates the vent valve. This method of operation is sensitive to different pressures carried in the train brake pipe and thus is less desirable. These include #8 vent valve, KMZ vent valve and VX vent valve in use today.

Where the control volume is vented to atmosphere, a valve is provided to throttle the exhaust of the control chamber to atmosphere during a service brake application in accordance with the actual rate of brake pipe pressure reduction. Once the brake application is terminated, the exhausting of the control chamber to atmosphere must also be terminated.

While most recent designs are directed to exhausting the control chamber to brake pipe, there is a need to return to the technology wherein the control volume is vented to atmosphere directly. This will increase the controllability of and the use of the brake pipe as a control throughout the train.

Thus, it is an object of the present invention to provide an improved emergency vent valve which exhausts the control volume to atmosphere.

These and other objects are achieved by providing an emergency vent valve which has a control volume, a piston response to the differential pressure between brake pipe and the control volume to operate a vent valve and an exhaust valve responsive to a differential pressure between brake pipe and control volume to connect the control volume to atmosphere. Further included is a first choke for releasing fluid from said control volume at a first or service rate when the exhaust valve is open and a second choke for limiting the release of fluid from said control volume to atmosphere to a second or blow down rate less than the first rate when the vent valve and exhaust valve are both open.

A choke valve connects the control volume to atmosphere through the second lower rate choke when opened by the piston. The choke valve connects the second choke in series with the first choke. The first choke is a passage between the exhaust valve and a bore. The choke valve is a spool valve connected to the piston and slides in the bore. The bore is the interior of a bushing and the first choke is in the bushing. The second choke is in the spool valve. The choke valve connects the second choke in series with the first choke when the vent valve and the exhaust valve are fully opened.

The piston is connected to a vent valve by a loss motion. A charging choke is provided in the piston for charging the control volume from the brake pipe. The exhaust valve is a diaphragm valve and includes a spring biasing the diaphragm valve closed. A housing has a brake pipe port and an exhaust port. The control volume, a piston, exhaust and vent valves as well as first and second choke are all provided in the housing.

Other objects, advantages and novel features of the present invention will become apparent from the following detailed description of the invention when considered in conjunction with the accompanying drawings.

DETAILED DESCRIPTION OF THE PREFERRED EMBODIMENT

Figure 1:
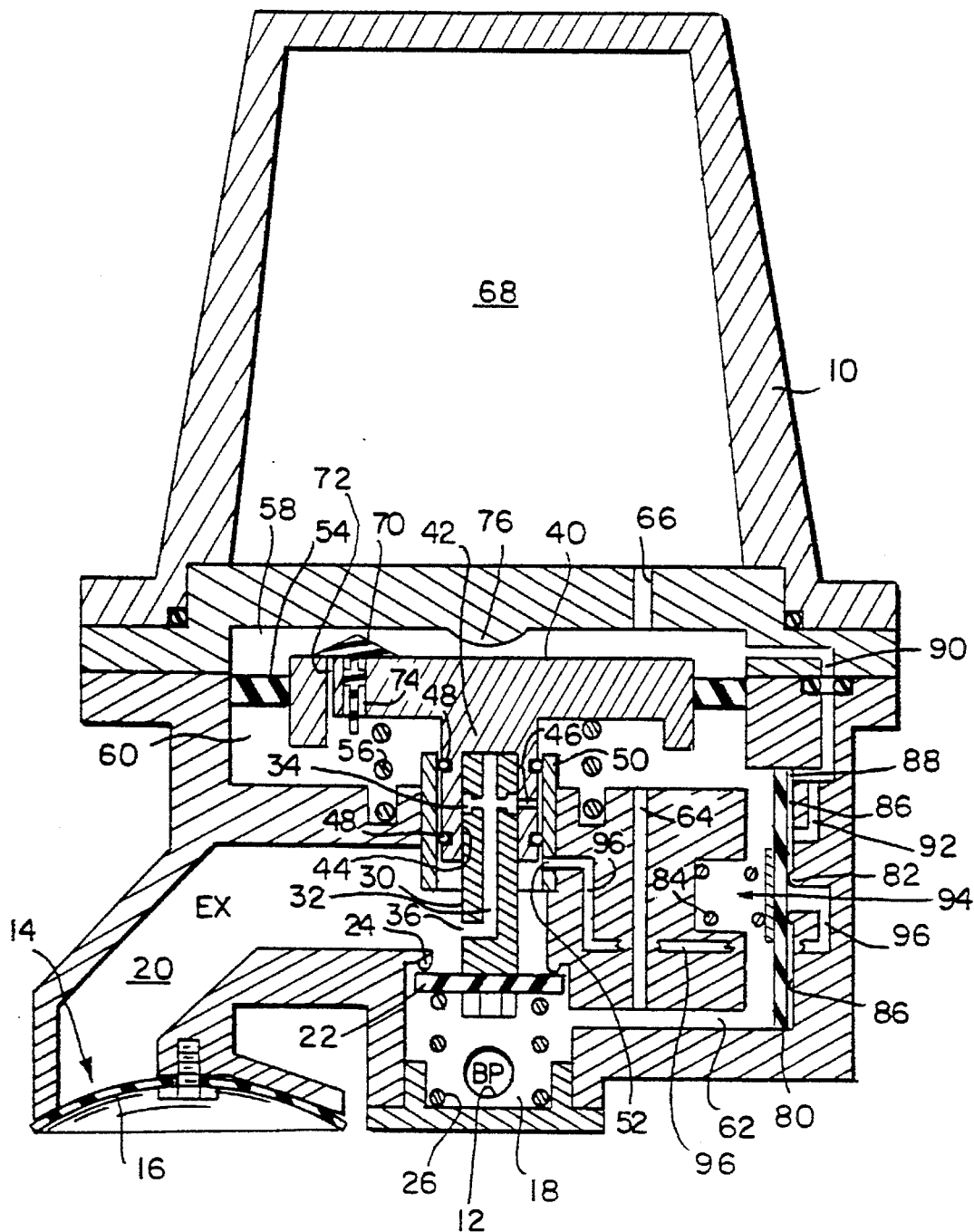
FIG. 1 is a cross-sectional view of a emergency vent valve according to the present invention in its release position.

An emergency vent valve includes a housing 10 having a brake pipe port 12 and an exhaust port 14 covered by a protective flap 16. The brake pipe port 12 is connected to a chamber 18 which is connected to an exhaust passage 20 by a vent valve 22 which rests on seat 24. A spring 26 biases the vent valve 22 against its seat 24. The vent valve 22 is connected to a rod 30 which has a central bore 32. A radial bore 34 is connected to the upper end of the central bore 32 and a radial bore 36 connects the central bore to the exhaust passage 20 adjacent to the lower end of the central bore 32. A piston 40 includes a bore 44 in its stem 42 in which is press fitted the rod 30 of the vent valve 22. This press fit connection allows some lost motion between the vent valve 22 and the piston 40 if the piston should over travel in its upward position while the vent valve 22 is closed.

The piston stem 42 includes a bore 46 which aligns with the radial bore 34 of the rod 30. The diameter of bore 46, which may be for example, 0.050 inches, defines a blow-down choke for the control volume. The piston stem 42 rides on a bushing 50 in the housing 10. The bushing 50 includes a bore 52 whose diameter, which may be for example, 0.025 inches, forms the service choke for exhausting the control volume to follow the reduction of pressure in the brake pipe and distinguish between a service and a brake application. Seals 48, for example O rings, surround the blow-down choke 46 and slidably seal the blow-down choke 46 in the bushing 50. The rod 30, piston stem 42, bushing 50 and related bores and passages define a choke valve or spool valve to control the chokes between a control volume exhaust valve and atmosphere. By defining the blow-down choke and the service choke by bores in the piston stem 42 and the bushing 50, their values can be readily changed or adjusted without changing the casting for the housing 10.

The piston 40 is connected to the housing 10 by a diaphragm 54 and is biased to its upper position by a spring 56. The diaphragm 54 and the piston 40 have a control volume chamber 58 on their top surface and a brake pipe chamber 60 on their bottom surface. Passages 62 and 64 connect the chamber 18 to chamber 60 below the piston 40 and diaphragm 54. Passage 66 connects a control volume 68 to the chamber 58 above the piston 40 and diaphragm 54. A charging check valve 70 and bore or charging choke 72 whose diameter, which may be, for example, 0.016 inches, are in the piston 40. The check valve 70 sealably slides in a bore 74. When the pressure in the lower brake pipe chamber 60 is greater than the pressure in the upper control volume chamber 58, check valve 70 opens up charging choke 72 in the piston. A stop 76 is provided in the top wall of chamber 58 to prevent any overrun of the piston 40 from damaging the check valve 70.

An exhaust valve 80, illustrated as a diaphragm valve, is biased against valve seat 82 by spring 84. Diaphragm stops 86 are provided displaced from the valve seats 82. Chamber 88 on one side of the exhaust valve 80 is connected to the control volume 68 by passages 90 and 92 and chamber 94 on the other side is connected to brake pipe by passage 62. Spring 84 lies in chamber 94. Chamber 94 also connects brake pipe passage 62 to the lower brake pipe chambers 60 below the piston 40 and diaphragm 54, although this connection may be eliminated without affecting operation of the valves. The passage 92, which is connected to passage 90, provides control volume pressure on both sides of the stop 86. A passage 96 connects the exhaust valve seat 82 to the blow-down choke 52 in the bushing 50.

Charging and Release

In its uncharged position, the emergency vent valve is generally illustrated in FIG. 1. Spring 26 keeps the vent valve 22 closed and spring 56 maintains the piston 40 in its shown position. Spring 84 maintains exhaust valve 80 closed. When the brake pipe is being charged to charge the system, brake pipe pressure from port 12 will flow into chamber 60 below the piston 40 through passages 62 and 64. Once this passage builds up sufficient pressure, it will open charging check valve 70 uncovering the charging choke 72. The upper chamber 58 will become pressurized and control volume 68 will be charged through passage 66. Once the control volume 68 and the brake pipe have reached an equilibrium the charging check 70 will close, as illustrated.

Service Application

Figure 2:
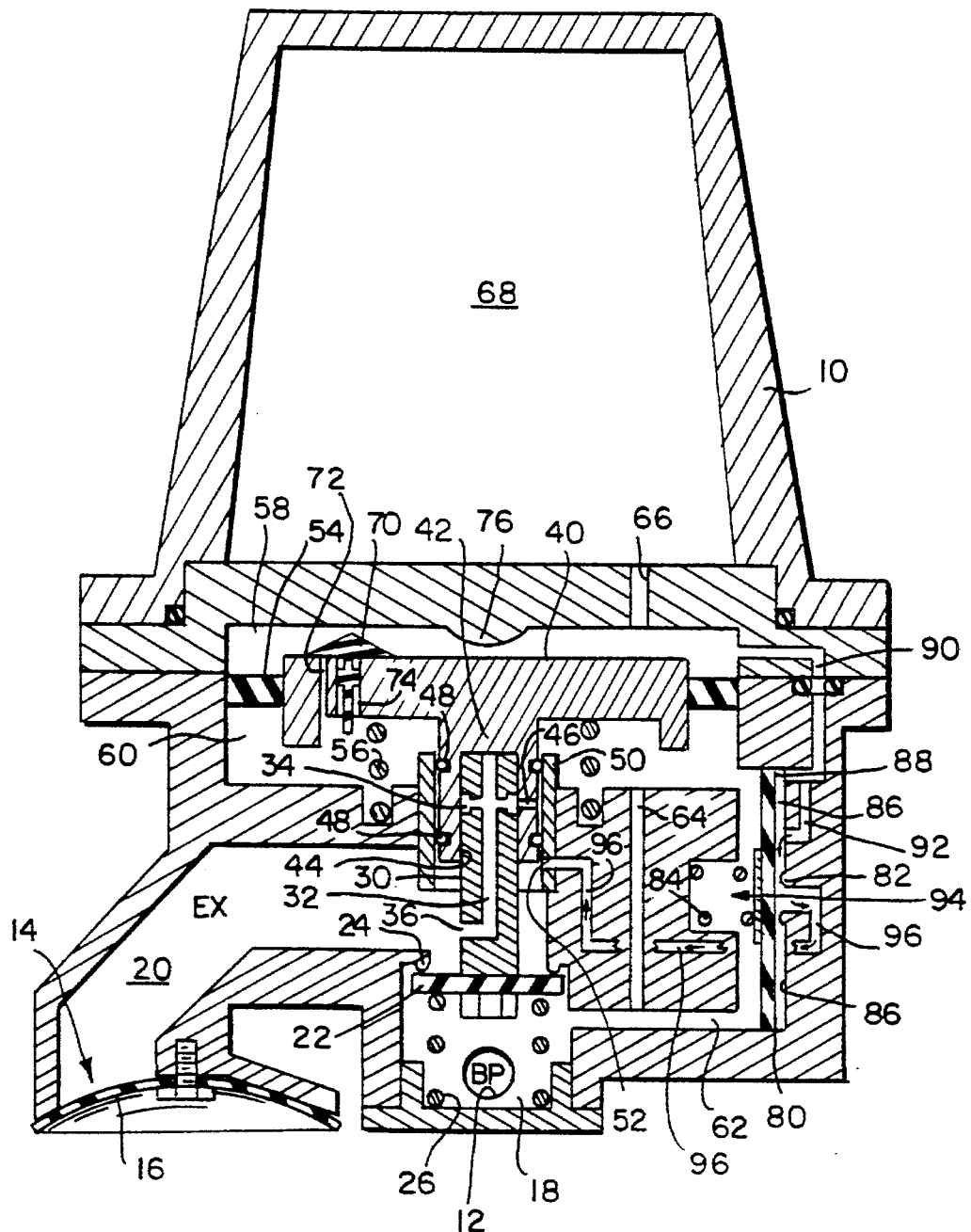
FIG. 2 is a cross-sectional view of the valve of FIG. 1 in its service application position.

In a service application as illustrated in FIG. 2, brake pipe will reduce at a service rate. The pressure in chamber 94 to the left of the exhaust valve 80 will decrease compared to the control volume pressure in chamber 88 to the right side of the exhaust valve 80. Once this pressure reaches a differential sufficient to overcome the spring 84, exhaust valve 80 will unseat from seat 82 thereby connecting the control volume 68 to exhaust through passages 96 and service choke 52. Spring 84, for example, maybe half a pound and a differential of about half of PSI will open the exhaust valve 80. If the rate of reduction of the brake pipe pressure is less than nominally 14 PSI per second, the service choke 52 will provide a rate of flow from the control volume 68 sufficient to maintain a balance across piston 40 which keeps vent valve 22 closed. The exhaust valve 80 will close when the brake pipe and the control volume pressures are approximately equal.

Release

In a release, the brake applied pressure is increased. This increase of brake pipe pressure is sensed by the charging check valve 70 which opens to allow the brake pipe in release to recharge the control volume 68 through the charging choke 72. After the release is terminated, the elements are in the position illustrated in FIG. 1.

Emergency Application

If the rate of brake pipe reduction exceeds nominally 16 PSI per second, the service or exhaust choke 52 will retard the flow of pressure from the control chamber 68 through open exhaust valve 80. This creates a differential across the diaphragm 40. When the brake pipe pressure is 2 PSI less than the control volume pressure, the piston 40 will move down against spring 56 and spring 26, which are for example 5 pounds and 2 pounds respectively, opening vent valve 22. The enlarged capacity of exhaust passage 20 rapidly vents the brake pipe to atmosphere. With the vent valve 22 partially opened, the pressure is reduced in chamber 94 and the exhaust valve 22 fully opens.

Figure 3:
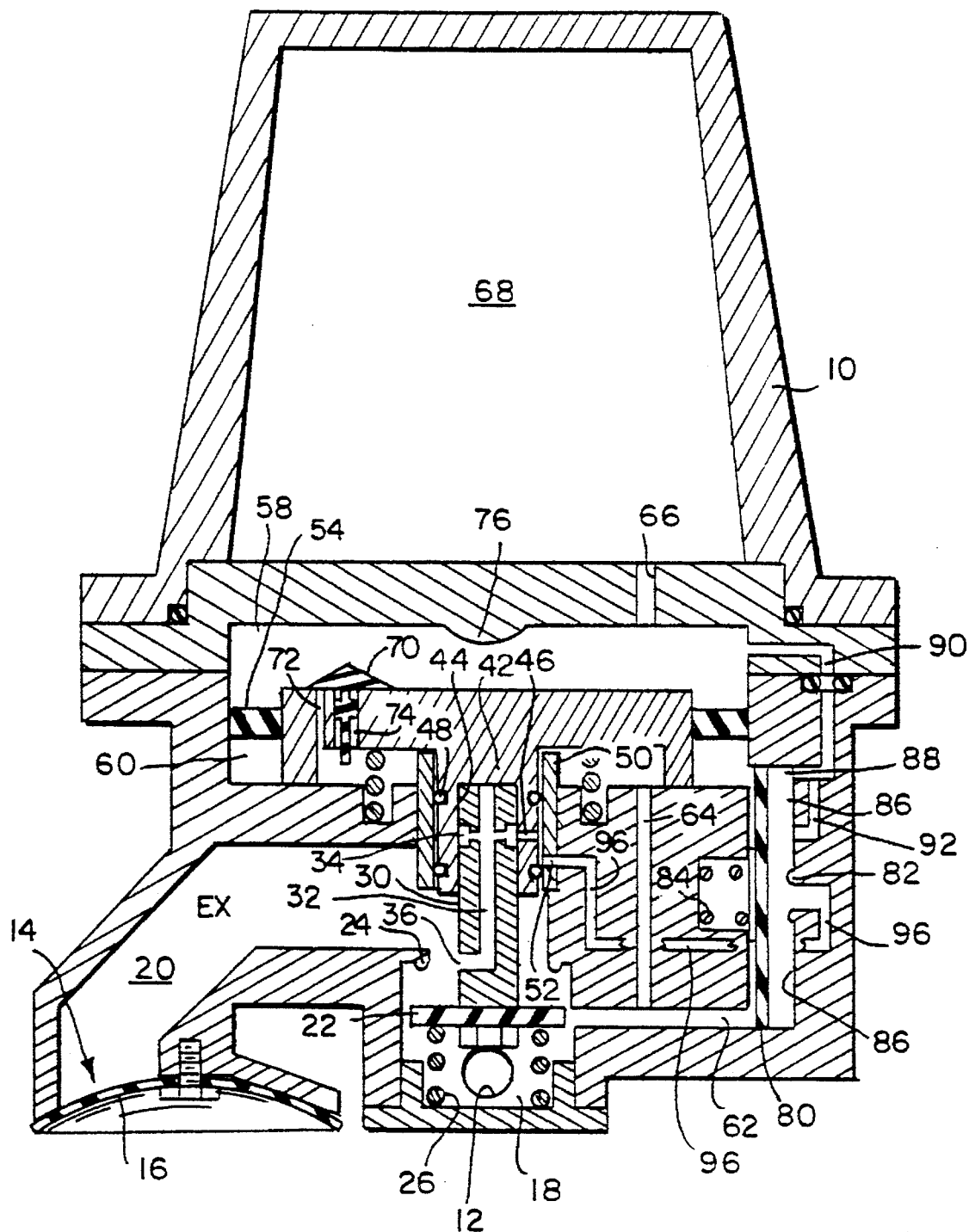
FIG. 3 is a cross-sectional view of the valve of FIG. 1 in its emergency application position.

With further downward movement of the piston 40 to its bottom position illustrated in FIG. 3, the vent valve 22 is fully opened. Also the lower seal 48 on the piston stem 42 passes the service check 52 cutting off from direct connection to the exhaust passage 20 and connects it to the exhaust passage 20 through series blow-down choke 46, radial bore 34, center bore 32 and radial bore 36. Since the blow-down choke 46 is smaller than the service choke 52, the blow-down choke 46 determines the blow-down rate. This is the rate at which the control volume 68 will blow-down to atmospheric pressure. The blow-down choke 46 is selected so as to maintain the vent valve 22 open long enough to propagate the emergency signal through the train and provide full emergency brake cylinder pressure before it releases. Preferably the vent valve 22 should remain open at least 30 seconds after an emergency. Typically, the service choke 52 would have a diameter 0.050 inches while the blow-down choke would have a diameter of 0.025 inches. This would decrease the rate of exhaust of the control chamber 68 by a quarter for blow-down.

When the control volume pressure in chamber 58 on the top of piston 40 is decreased to nominally 0.6 PSI, the combined forces of springs 56 and 26 will move the piston 40 up closing the vent valve 22. Similarly, spring 84 will dose the exhaust valve 80.

It should be noted that the emergency vent valve does not include the following conventional elements in an emergency portion of a control valve: a) AAV (continuous quick service or accelerated application); b) Emergency In-shot; and c) Emergency Accelerated Release.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed:

1. An emergency vent valve for a vehicle air brake system in which brakes are applied and released in response to decreases and increases in pressure in a brake pipe, said emergency vent valve comprising:

control volume;

piston means subject to control volume pressure on one side and brake pipe pressure on an opposite side;

exhaust valve means responsive to a differential pressure between brake pipe and control volume for connecting said control volume to atmosphere when said control volume pressure exceeds brake pipe pressure by a given amount;

first choke means for releasing fluid from said control volume at a first rate when said exhaust valve means is open;

vent valve means for connecting said brake pipe to atmosphere when opened by said piston means when brake pipe pressure reduction exceeds said first rate; and second choke means for limiting the releasing fluid from said control volume to atmosphere at a second rate less than said first rate when said vent valve means and said exhaust valve means are both open.

2. An emergency vent valve according to claim 1 including choke valve means for connecting said control volume to atmosphere through said second choke means when opened by said piston means and when said vent valve means and said exhaust valve means are open.

3. An emergency vent valve according to claim 2 wherein said choke valve means connects said second choke means in series with said first choke means when open.

4. An emergency vent valve according to claim 3, wherein said first choke means is in a passage between said exhaust valve means and a bore; and said choke valve means is a spool valve connected to said piston means and sliding in said bore.

5. An emergency vent valve according to claim 4 wherein said bore is interior a bushing and said first choke means is in said bushing.

6. An emergency vent valve according to claim 4 wherein said second choke means is in said spool valve.

7. An emergency vent valve according to claim 1 including choke valve means for connecting said second choke means in series with said first choke means when said vent valve means and said exhaust valve means are fully opened.

8. An emergency vent valve according to claim 7 wherein said choke valve means is operatively connected to said piston means.

9. An emergency vent valve according to claim 1 including lost motion means connecting said piston means to said vent valve means.

10. An emergency vent valve according to claim 1 including a charging check valve in said piston means for charging said control volume from said brake pipe.

11. An emergency vent valve according to claim 1 wherein said exhaust valve means is a diaphragm valve.

12. An emergency vent valve according to claim 11 wherein said exhaust valve means includes a spring biasing said diaphragm valve closed.

13. An emergency vent valve according to claim 1 including a housing having a brake pipe port and an exhaust port; and wherein said control volume, piston means, exhaust and vent valve means and said first and second choke means are in said housing.

* * * * *